United States Patent
Yaita et al.

(10) Patent No.: US 11,801,742 B2
(45) Date of Patent: Oct. 31, 2023

(54) VEHICLE-MOUNTED BATTERY PACK

(71) Applicant: HONDA MOTOR CO., LTD., Tokyo (JP)

(72) Inventors: Satoshi Yaita, Wako (JP); Ken Yasui, Wako (JP); Satoru Kawabe, Wako (JP); Masaaki Tatsuwaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/577,462

(22) Filed: Jan. 18, 2022

(65) Prior Publication Data

US 2022/0227214 A1    Jul. 21, 2022

(30) Foreign Application Priority Data

Jan. 20, 2021   (JP) ................. 2021-007447

(51) Int. Cl.
| | |
|---|---|
| *B60K 1/04* | (2019.01) |
| *B60L 50/60* | (2019.01) |
| *H01M 50/242* | (2021.01) |
| *H01M 50/249* | (2021.01) |

(52) U.S. Cl.
CPC ............. *B60K 1/04* (2013.01); *B60L 50/66* (2019.02); *H01M 50/242* (2021.01); *H01M 50/249* (2021.01); *B60K 2001/0438* (2013.01); *H01M 2220/20* (2013.01)

(58) Field of Classification Search
CPC ... B60K 1/04; B60K 2001/0438; B60L 50/66; H01M 50/242; H01M 50/249
See application file for complete search history.

(56) References Cited

U.S. PATENT DOCUMENTS

| | | | | |
|---|---|---|---|---|
| 6,227,322 B1* | 5/2001 | Nishikawa | ............. | B60R 16/04 |
| | | | | 180/68.5 |
| 2009/0145676 A1* | 6/2009 | Takasaki | ............... | H01M 10/48 |
| | | | | 180/68.5 |
| 2011/0300427 A1* | 12/2011 | Iwasa | ................... | H01M 50/209 |
| | | | | 429/158 |

(Continued)

FOREIGN PATENT DOCUMENTS

| | | | | |
|---|---|---|---|---|
| CN | 108327499 | | 7/2018 | |
| DE | 102018206100 A1 * | 10/2019 | ............... | B60K 1/04 |

(Continued)

OTHER PUBLICATIONS

Chinese Office Action for Chinese Patent Application No. 202210046200.5 dated Feb. 22, 2023.

*Primary Examiner* — Frank B Vanaman
(74) *Attorney, Agent, or Firm* — AMIN, TUROCY & WATSON, LLP

(57) ABSTRACT

A vehicle-mounted battery pack includes a battery tray including a floor part, a right frame, and a left frame. The battery tray includes a battery disposition region, a right impact-absorbing region, and a left impact-absorbing region. A battery module is placed in a battery disposition region. The left and right impact-absorbing regions are provided on outer sides of the battery disposition region in the vehicle width direction. The right frame and the left frame are formed to be thinner than the right and left impact-absorbing regions. Further, an easily deformable portion is formed at a lower portion of the right and left impact-absorbing regions.

4 Claims, 12 Drawing Sheets

(56) References Cited

U.S. PATENT DOCUMENTS

| | | | |
|---|---|---|---|
| 2012/0073888 A1* | 3/2012 | Taneda | H01M 50/242 |
| | | | 180/68.5 |
| 2012/0153682 A1* | 6/2012 | Rawlinson | B60J 10/85 |
| | | | 296/209 |
| 2016/0114667 A1* | 4/2016 | Ikeda | H01M 50/24 |
| | | | 180/68.5 |
| 2017/0305251 A1* | 10/2017 | Hara | H01M 50/262 |
| 2018/0148106 A1* | 5/2018 | Ayukawa | B62D 25/20 |
| 2018/0208038 A1 | 7/2018 | Ozawa et al. | |
| 2018/0236863 A1 | 8/2018 | Kawabe et al. | |
| 2018/0312199 A1 | 11/2018 | Kawase | |
| 2018/0370577 A1 | 12/2018 | Takahashi | |
| 2019/0190096 A1 | 6/2019 | Shen et al. | |

FOREIGN PATENT DOCUMENTS

| | | | | |
|---|---|---|---|---|
| JP | 2013133046 A | * | 7/2013 | B60K 1/04 |
| JP | 2017-196952 | | 11/2017 | |
| JP | 2019-531955 | | 11/2019 | |

* cited by examiner

VEHICLE-MOUNTED BATTERY PACK

CROSS-REFERENCE TO RELATED APPLICATION

Priority is claimed on Japanese Patent Application No. 2021-007447, filed Jan. 20, 2021, the content of which is incorporated herein by reference.

BACKGROUND OF THE INVENTION

Field of the Invention

The present invention relates to a vehicle-mounted battery pack.

Description of Related Art

As a vehicle-mounted battery pack, for example, a configuration in which a battery module is placed on a tray bottom plate (hereinafter, referred to as a floor part), an attachment beam (hereinafter, referred to as a frame body) is provided around the floor part, and the frame body is attached to the bottom of the vehicle is known. The floor part includes an upper plate, a middle plate, and a lower plate, and a cooling cavity is formed between the upper plate and the middle plate. Further, a buffer cavity is formed between the middle plate and the lower plate (that is, below the cooling cavity).

For example, a cooling pipe for cooling the battery module is disposed in the cooling cavity. The buffer cavity protects, for example, the battery module against an impact from below (see, for example, Published Japanese Translation No. 2019-531955 of the PCT International Publication).

SUMMARY OF THE INVENTION

Here, the conventional buffer cavity can protect the battery module against an impact from below. However, in the conventional buffer cavity, for example, when a load is input from the side of the vehicle body due to side collision, it is difficult to protect the battery module by absorbing the input load. Therefore, there is a possibility that the frame body is deformed inward in the vehicle width direction by the load input from the side of the vehicle body due to the side collision, and the battery module (that is, batteries) is damaged.

As a countermeasure, for example, it is conceivable to reinforce the floor part. However, when the floor part is reinforced, it is difficult to reduce the weight of the vehicle, and there is room for improvement from this viewpoint.

An aspect of the present invention provides a vehicle-mounted battery pack capable of protecting a battery, and furthermore achieving weight reduction.

(1) A vehicle-mounted battery pack according to one aspect of the present invention includes: a battery tray including a floor part disposed at a floor of a vehicle, and a frame body having side frames that are provided on at least left and right sides of the floor part in a vehicle width direction and that are attached to the vehicle, wherein the battery tray includes: a battery disposition region provided at a center in the vehicle width direction and on which a battery module consisted by a plurality of batteries is placed, and an impact-absorbing region provided on an outer side of the battery disposition region in the vehicle width direction, and wherein the side frame is formed to be thinner than the impact-absorbing region, and the impact-absorbing region includes an easily deformable portion, which is formed of at least one of an inclined portion and a thin portion, at a lower portion thereof.

According to the composition of the aspect of the above mentioned (1), the battery module is placed in the battery disposition region of the battery tray, and the impact-absorbing region is provided on an outer side of the battery disposition region in the vehicle width direction. Further, the side frames provided on the left and right sides in the vehicle width direction are formed to be thinner than the impact-absorbing region. Furthermore, the easily deformable portion is formed in a lower portion (lower surface) of the impact-absorbing region. The easily deformable portion is formed of at least one of the inclined portion and the thin portion.

Therefore, for example, when a load (hereinafter, sometimes referred to as a side collision load) is input from the side of the vehicle body due to the side collision, the impact energy can be favorably absorbed by deforming the impact-absorbing region downward and crushing (compressing) the side frames using the side collision load input. Furthermore, the impact-absorbing region is thicker than the side frames. Therefore, deformation of the impact-absorbing region due to the side collision load input can be minimized in a range where the battery module can be protected.

Thus, the battery module can be protected, it is not necessary to reinforce the vehicle pack more than necessary, and the weight of the vehicle pack can be reduced.

(2) In the aspect of the above mentioned (1), the side frames may have a thin portion at the center of the cross section thereof.

According to the composition of the aspect of the above mentioned (2), the thin portion is formed at the center of the cross section of the side frames. Therefore, the side frames can be crushed from the center of the cross section by the side collision load input by the side collision. Thus, crushing of the side frames due to the side collision load can be generated across the side frames, and the impact energy absorption effect can be enhanced.

(3) In the aspect of the above mentioned (1) or (2), a lower portion of the side frames may be disposed at a position lower than a lower portion of the battery disposition region in an up-down direction.

According to the composition of the aspect of the above mentioned (3), the lower portion of the side frames is disposed at a position lower than the lower portion of the battery disposition region in the up-down direction. Therefore, when the side frames are crushed by the side collision load input by the side collision, the impact-absorbing region can be deformed downward. Thus, when the side frames are crushed, it is possible to prevent the lower portion of the side frames from interfering with the lower portion of the impact-absorbing region. As described above, the impact-absorbing region is favorably deformed downward and the side frames are favorably crushed, so that the impact energy absorption effect can be enhanced.

(4) In the aspect of any one of the above mentioned (1) to (3), the lid may be fixed to an upper portion of the side frames on the battery module side, and the side frames may include a projection projecting outward from the lid in the vehicle width direction, and an outer portion of the projection may be fixed at an outer side of the vehicle in the vehicle width direction.

According to the constitution of the aspect of the above mentioned (4), the side frames are formed with the projection projecting outward from the lid in the vehicle width direction. The lid is fixed to an upper portion of the projection on the battery module side. Furthermore, the outer portion of the projection is fixed to the outer side of the vehicle in the vehicle width direction (for example, inner panel of side sill). Therefore, at above of the side frames, a deformation allowing space that allows crushing of the side frames (specifically, the projection) can be ensured between the upper portion and the outer portion thereof. Thus, the side frames (projection) can be favorably crushed by the side collision load input by the side collision, and the impact energy absorption effect can be enhanced.

(5) In the aspect of the above mentioned (4), a projecting inclined portion may be provided at an upper portion of the projection, the projecting inclined portion may be inclined upward from an outer side in the vehicle width direction toward an inner side in the vehicle width direction; and an L-shaped closed cross-section may be provided between the projecting inclined portion and the easily deformable portion, the L-shaped closed cross-section may include a vertically closed cross-section vertically erected toward the projecting inclined portion, and a horizontally closed cross-section projecting inward in the vehicle width direction from a lower portion of the vertically closed cross-section toward the easily deformable portion.

According to the composition of the aspect of the above mentioned (5), the projecting inclined portion is formed at the upper portion of the projection, and the easily deformable portion is formed at the lower portion of the impact-absorbing region. The projecting inclined portion and the easily deformable portion are inclined upward from the outer side in the vehicle width direction toward the inner side in the vehicle width direction. Further, the L-shaped closed cross-section is provided between the projecting inclined portion and the easily deformable portion. Furthermore, the vertically closed cross-section of the L-shaped closed cross-section is vertically erected toward the projecting inclined portion, and the horizontally closed cross-section is projected inward in the vehicle width direction from the lower portion of the vertically closed cross-section toward the easily deformable portion.

Therefore, for example, the side collision load input by the side collision can generate a moment that moves the top of the vertically closed cross-section of the L-shaped closed cross-section inward in the vehicle width direction and moves the inner end of the horizontally closed cross-section downward. Specifically, for example, in the side frame on the right side of the vehicle body, the clockwise moment can be generated by the side collision load input by the side collision when viewed from the front side of the vehicle body. Thus, the easily deformable portion of the impact-absorbing region can be folded downward reliably.

Therefore, the projection 108 and the impact-absorbing region 116 can be favorably crushed by the side collision load F input by the side collision, and the impact energy absorption effect can be enhanced.

(6) In the aspect of any one of the above mentioned (1) to (5), a plurality of longitudinal batteries constituting the battery module may be arranged in the battery disposition region with a longitudinal direction thereof oriented in a vehicle front-rear direction, the vehicle-mounted battery pack may include a lower cross member that extends in the vehicle width direction at below the plurality of batteries placed in the battery disposition region and at a center of the battery tray in a front-rear direction of a vehicle body, and that is attached to the battery tray; and an upper cross member that extends in the vehicle width direction at above the lower cross member and at above the plurality of batteries, and by the upper cross member and the lower cross member, among the plurality of batteries arranged in the vehicle front-rear direction, ends of the plurality of batteries at a center side in the front-rear direction of the vehicle body may be fixed to the battery tray.

According to the composition of the aspect of the above mentioned (6), the plurality of longitudinal batteries constituting the battery module is arranged in the vehicle front-rear direction. Further, the lower cross member is provided below the battery module, and the upper cross member is provided above the battery module. Furthermore, among the plurality of batteries arranged in the vehicle front-rear direction, the ends of the plurality of batteries at the center side in the front-rear direction of the vehicle body are fixed to the battery tray by the lower cross member and the upper cross member. Thus, the plurality of batteries (that is, the battery module) can be stably fixed to the battery disposition region by the lower cross member and the upper cross member.

Further, the longitudinal batteries are arranged in the vehicle front-rear direction, and the lower cross member and the upper cross member are provided below and above the battery module, respectively. Therefore, the width of the battery module (that is, the battery disposition region) in the vehicle width direction can be suppressed to be narrow. Thus, a space (space) for forming the impact-absorbing region can be ensured between the battery disposition region and the side frames. Therefore, for example, the impact-absorbing region can be suitably deformed by the side collision load input by the side collision, and the battery module can be protected from the side collision load by the impact-absorbing region.

According to an aspect of the present invention, the side frames provided on the left and right sides in the vehicle width direction are formed to be thinner than the impact-absorbing region. Furthermore, the easily deformable portion is formed in a lower portion (lower surface) of the impact-absorbing region. Thus, the battery can be protected, and furthermore the weight can be reduced.

DETAILED DESCRIPTION OF THE INVENTION

Figure 1:
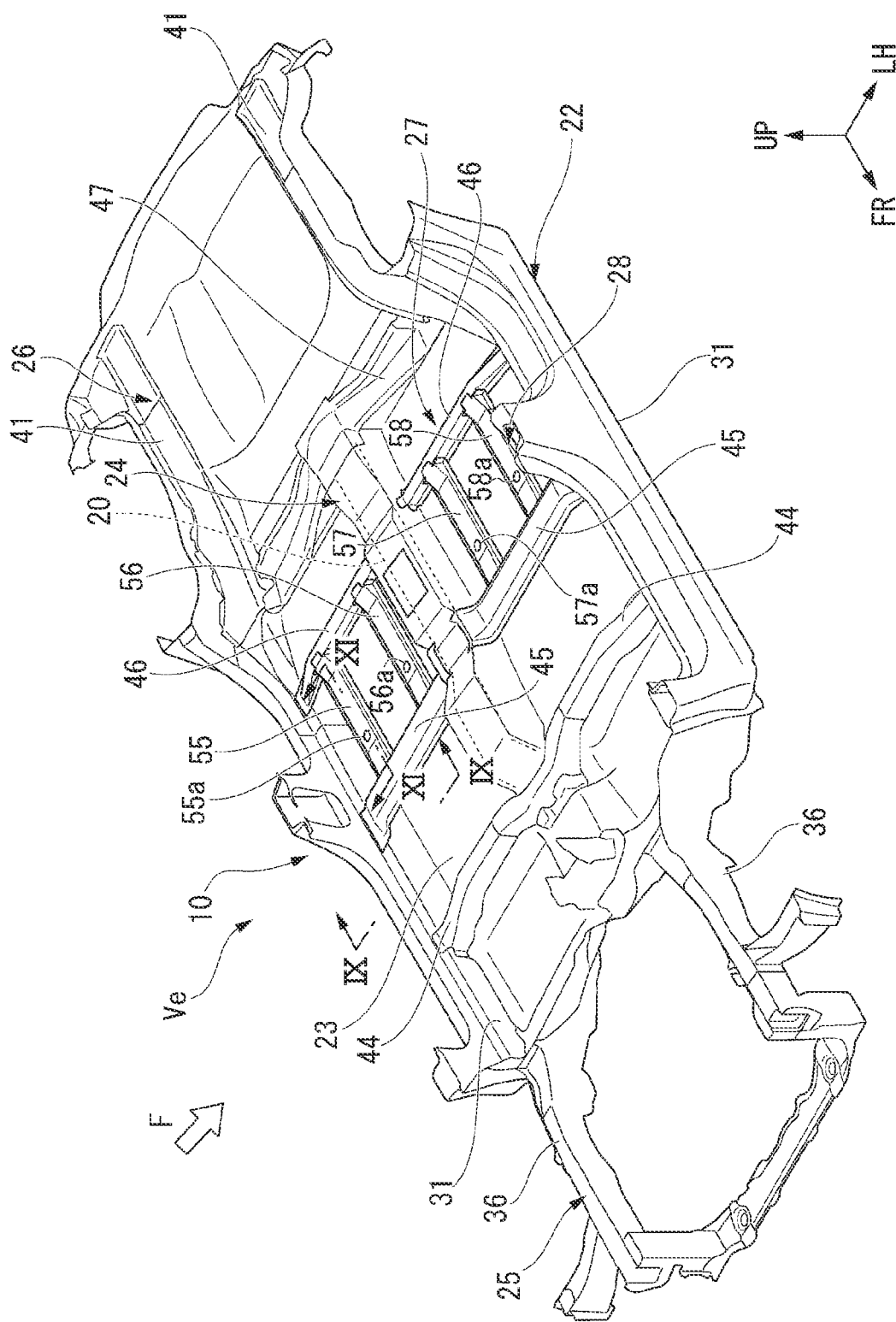
FIG. 1 is a perspective view of a vehicle including a vehicle-mounted battery pack of one embodiment according to the present invention.

Hereinafter, a vehicle-mounted battery pack according to one embodiment of the present invention will be described with reference to the drawings. In the drawings, an arrow FR indicates the front of the vehicle, an arrow UP indicates the upper side of the vehicle, and an arrow LH indicates the left side of the vehicle. Note that the use, type, and the like of the vehicle are not particularly limited, but an automobile will be described as an example as one embodiment. Further, the vehicle has a substantially bilaterally symmetrical constitution. Therefore, the left and right components will be described below with the same reference numbers.

<Vehicle>

Figure 2:
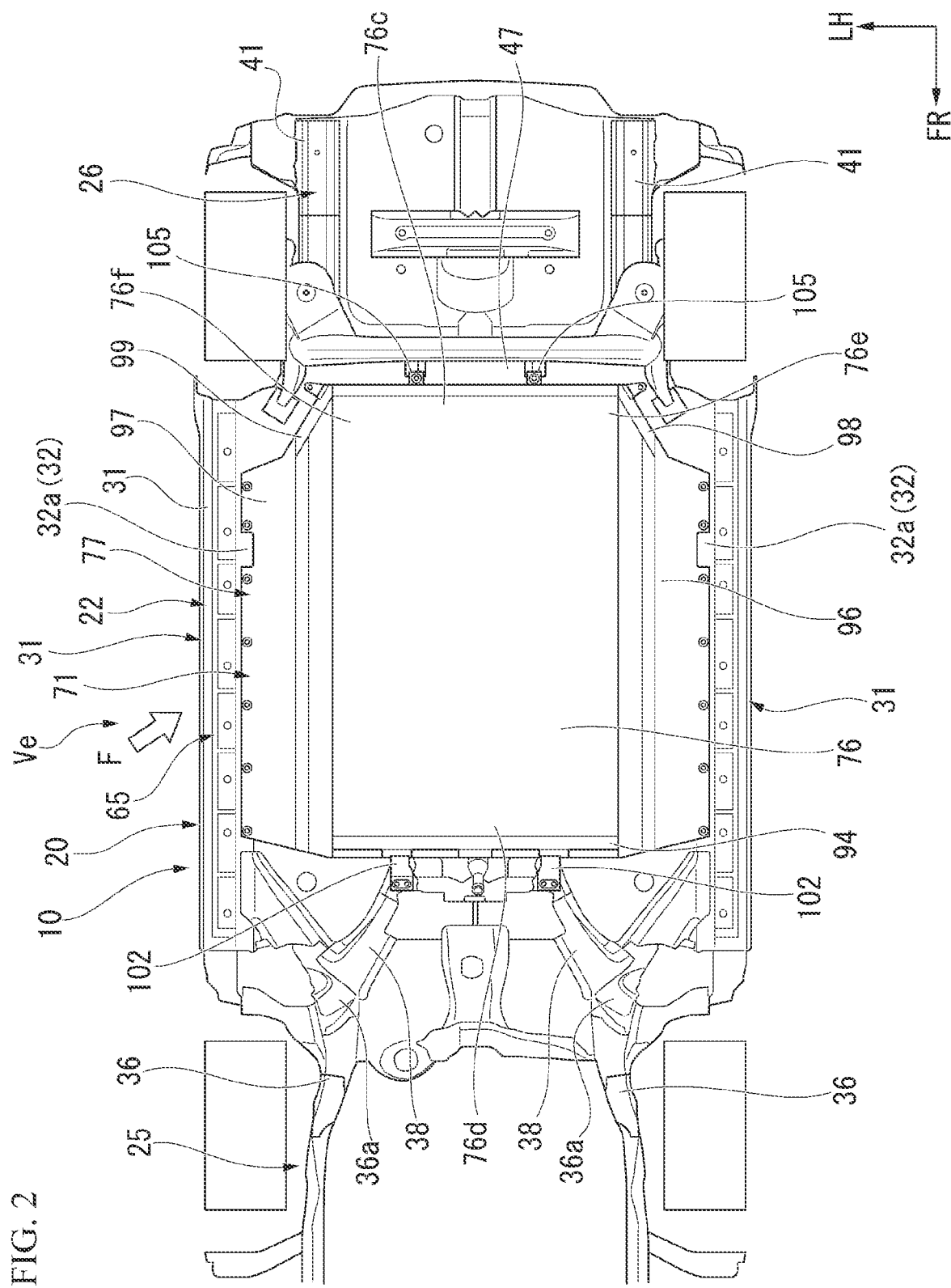
FIG. 2 is a bottom view of a vehicle including the vehicle-mounted battery pack of one embodiment.

As illustrated in FIGS. 1 and 2, a vehicle Ve includes a vehicle main body (hereinafter, sometimes referred to as a vehicle body 10) 10 and a vehicle-mounted battery pack 20. Hereinafter, the vehicle-mounted battery pack 20 may be simply referred to as a "battery pack 20".

<Vehicle Main Body>

The vehicle main body 10 includes a side sill unit 22, a floor panel 23, a floor tunnel 24, a front side frame unit 25, a rear frame unit 26, a floor cross member unit 27, and a floor vertical frame unit 28.

The side sill unit 22 includes a right side sill 31 and a left side sill 31. The right side sill 31 is formed in a closed cross section and is a member having high rigidity constituting a part of the framework of the vehicle body 10. The right side sill 31 is provided on a right outer side in the vehicle width direction, and extends in a front-rear direction of the vehicle body along a right outer portion of the floor panel 23 in the vehicle width direction.

The left side sill 31 is formed in a closed cross section and is a member having high rigidity constituting a part of the framework of the vehicle body 10. The left side sill 31 is provided on a left outer side in the vehicle width direction, and extends in the front-rear direction of the vehicle body along a left outer portion of the floor panel 23 in the vehicle width direction.

The floor panel 23 is provided between the left side sill 31 and the right side sill 31. The floor panel 23 is a plate-shaped member having a substantially rectangular shape in plan view, and forms the floor part of the vehicle Ve. The floor tunnel 24 extends in the front-rear direction of the vehicle body at the center of the floor panel 23 in the vehicle width direction. The floor tunnel 24 is raised upward from the floor panel 23.

The front side frame unit 25 includes a right front side frame 36 and a left front side frame 36. The right front side frame 36 and the left front side frame 36 are provided on the front side of the vehicle body with respect to the battery pack 20.

The rear frame unit 26 includes a right rear frame 41 and a left rear frame 41. The right rear frame 41 and the left rear frame 41 are provided on the rear side of the vehicle body with respect to the battery pack 20.

The floor cross member unit 27 is disposed between the right side sill 31 and the left side sill 31, and is joined along an upper surface of the floor panel 23.

The floor cross member unit 27 includes a right first floor cross member 44, a left first floor cross member 44, a right second floor cross member 45, a left second floor cross member 45, a right third floor cross member 46, a left third floor cross member 46, and a fourth floor cross member 47.

The floor tunnel 24 crosses (in the embodiment, orthogonal to) the left and right first floor cross members 44, the left and right second floor cross members 45, and the left and right third floor cross members 46, and extends in the front-rear direction of the vehicle body.

Figure 3:
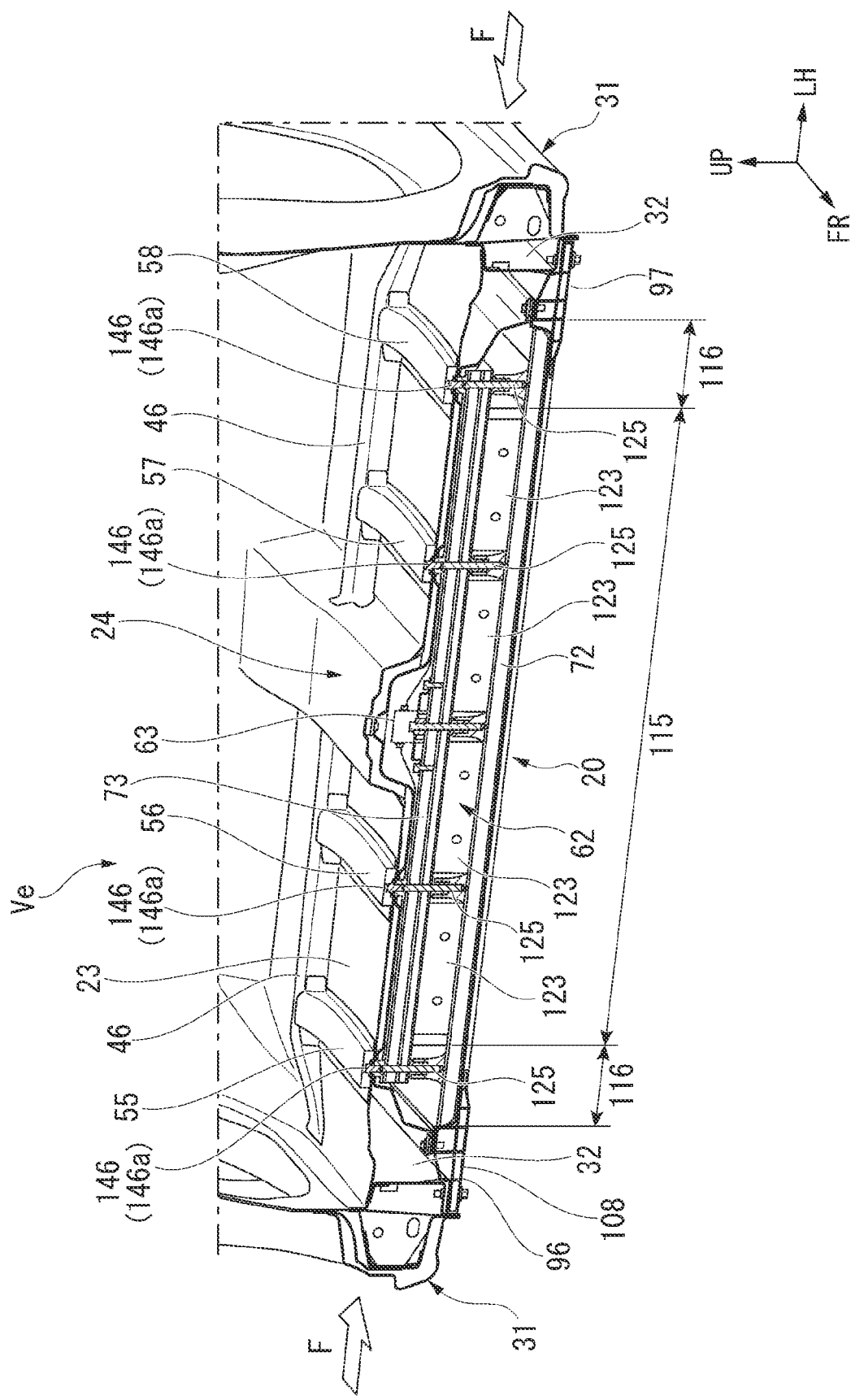
FIG. 3 is a perspective view of a vehicle including the vehicle-mounted battery pack of one embodiment broken at an upper cross member and a lower cross member.

As illustrated in FIGS. 1 and 3, the floor vertical frame unit 28 includes a plurality of first to fourth floor vertical frames 55 to 58 on the floor panel 23 at intervals in the vehicle width direction. Specifically, the first floor vertical frame 55 and the second floor vertical frame 56 are provided on the right side of the floor tunnel 24 on the floor panel 23 at an interval in the vehicle width direction. The third floor vertical frame 57 and the fourth floor vertical frame 58 are provided on the left side of the floor tunnel 24 on the floor panel 23 at an interval in the vehicle width direction. The battery pack 20 is provided below the floor panel 23.

<Battery Pack>

Figure 4:
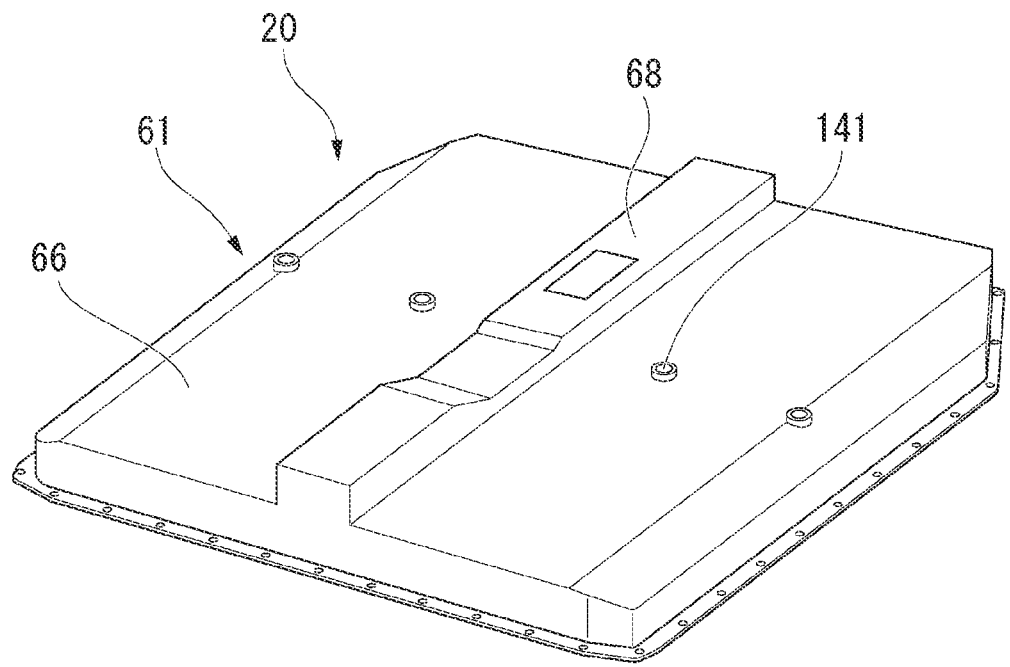
FIG. 4 is an exploded perspective view of a battery case of one embodiment in which a case cover is removed from a case body.
Figure 4:
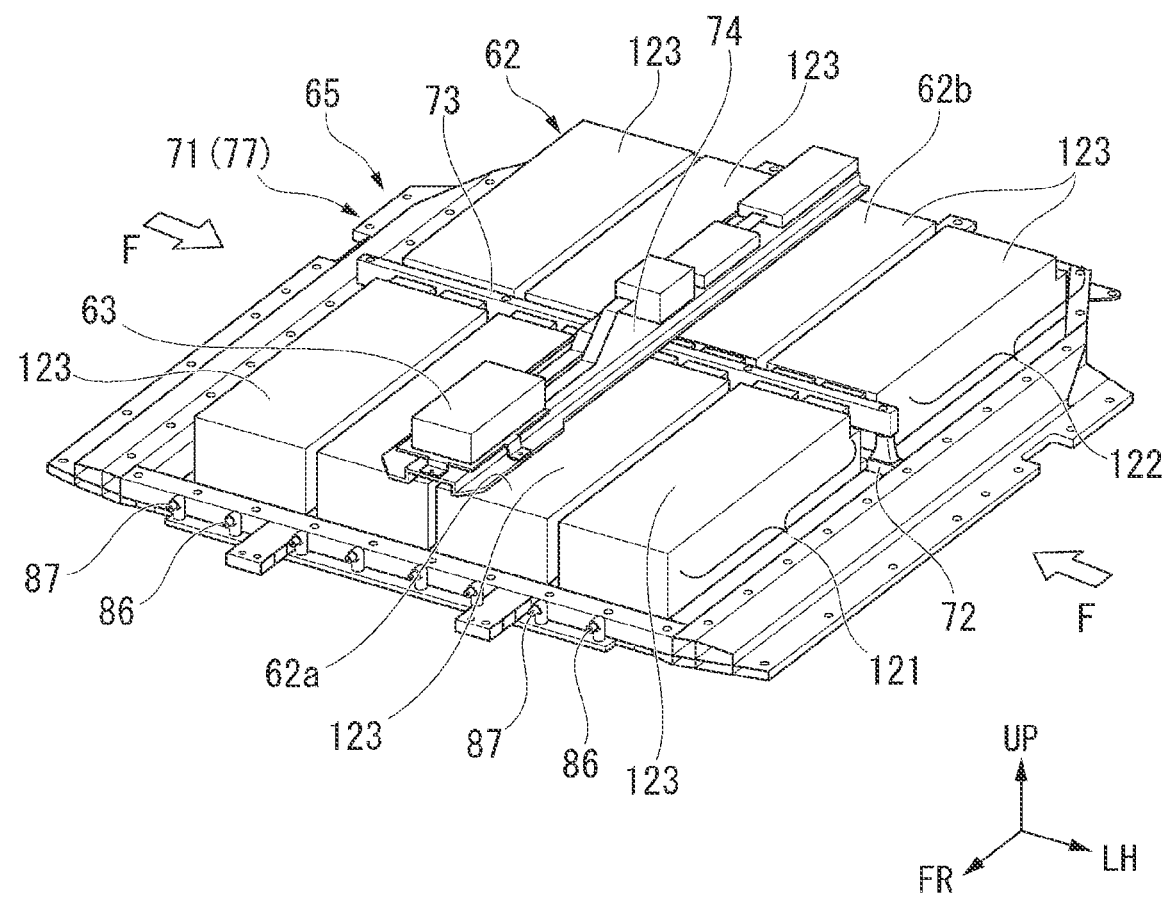

The battery pack 20 is provided below the floor panel 23 (that is, under the floor part of the vehicle Ve). Furthermore, the battery pack 20 is disposed below the left and right second floor cross members 45, the left and right third floor cross members 46, and the first to fourth floor vertical frames 55 to 58. As illustrated in FIG. 4, the battery pack 20 includes a battery case 61, a battery module 62, and an auxiliary battery 63.

(Battery Case)

Figure 5:
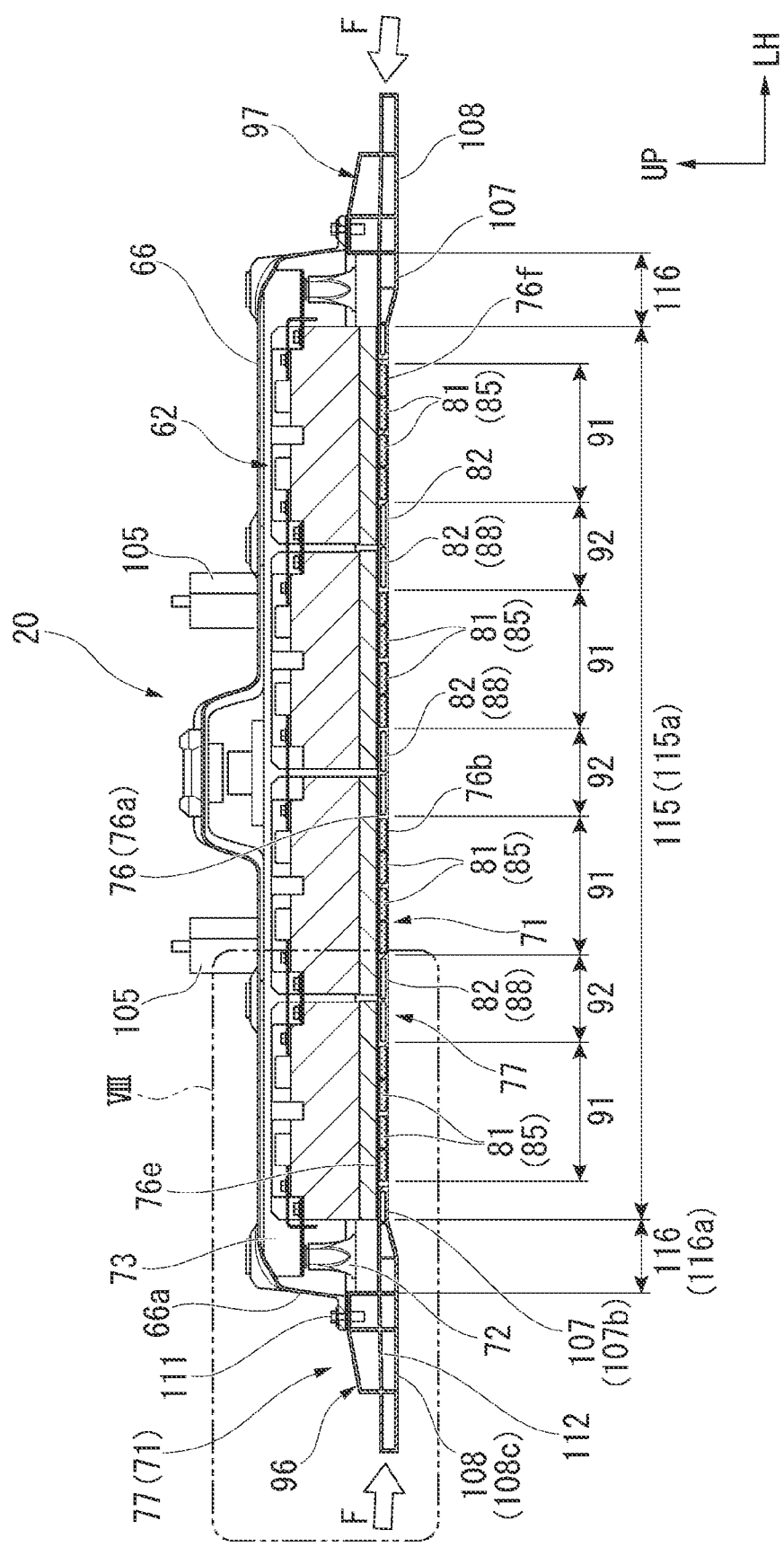
FIG. 5 is a cross-sectional view of the vehicle-mounted battery pack of one embodiment.
Figure 6:
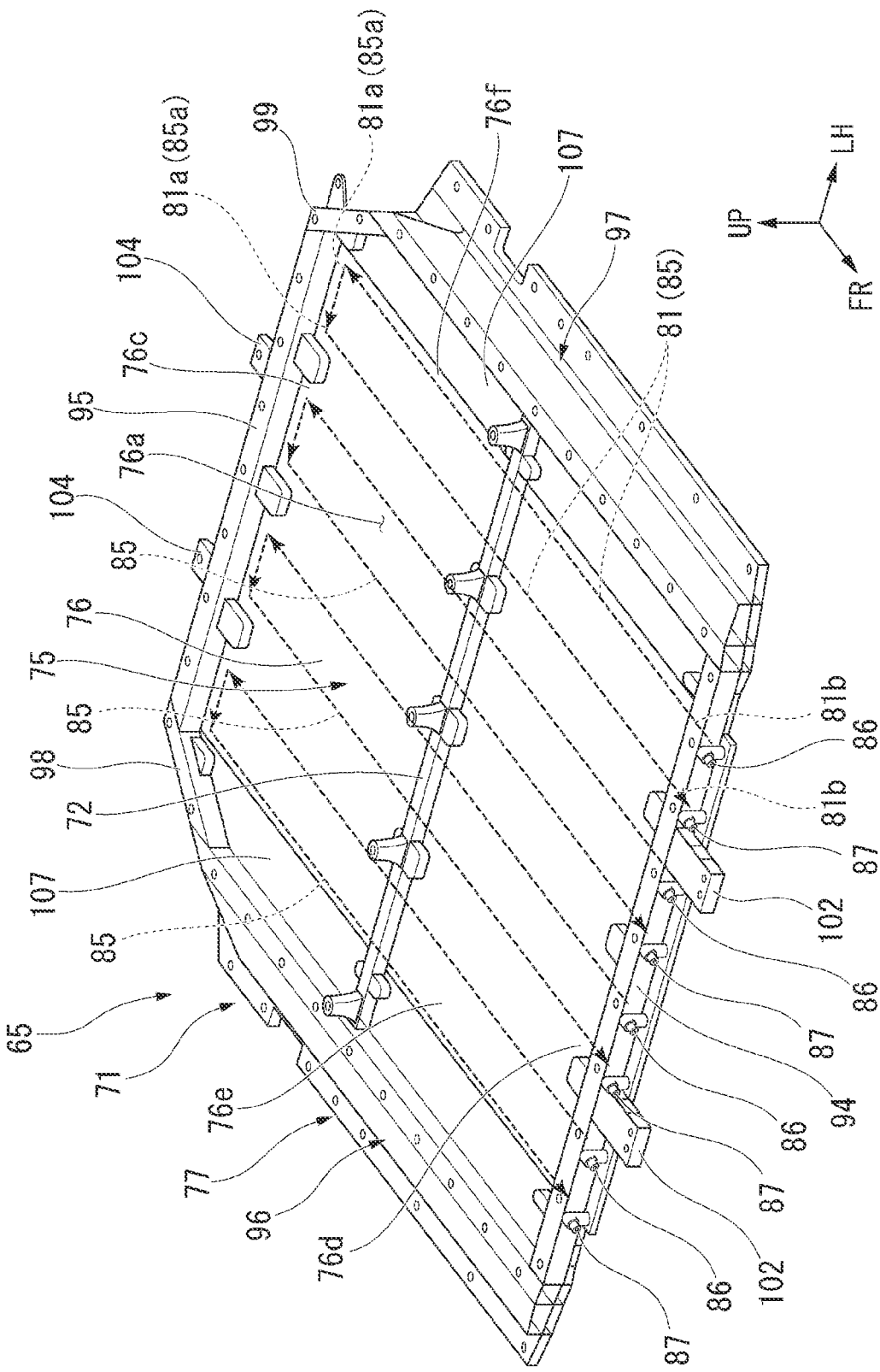
FIG. 6 is a perspective view illustrating a case body of one embodiment.

As illustrated in FIGS. 4 to 6, the battery case 61 includes a case body 65 and a case cover (lid) 66. The case body 65 includes a battery tray 71, a lower cross member 72, an upper cross member 73, and an upper deck 74. The battery tray 71 includes a floor part 76 and a frame body 77.

The floor part 76 is formed in, for example, a rectangular shape in plan view, and is provided under the floor of the vehicle Ve (see FIG. 1) and below the battery module 62 so that the battery module 62 can be placed. In the floor part 76, for example, a front surface 76a on which the battery module 62 is placed is formed flat, and a back surface 76b opposite to the front surface 76a is also formed flat.

Figure 7:
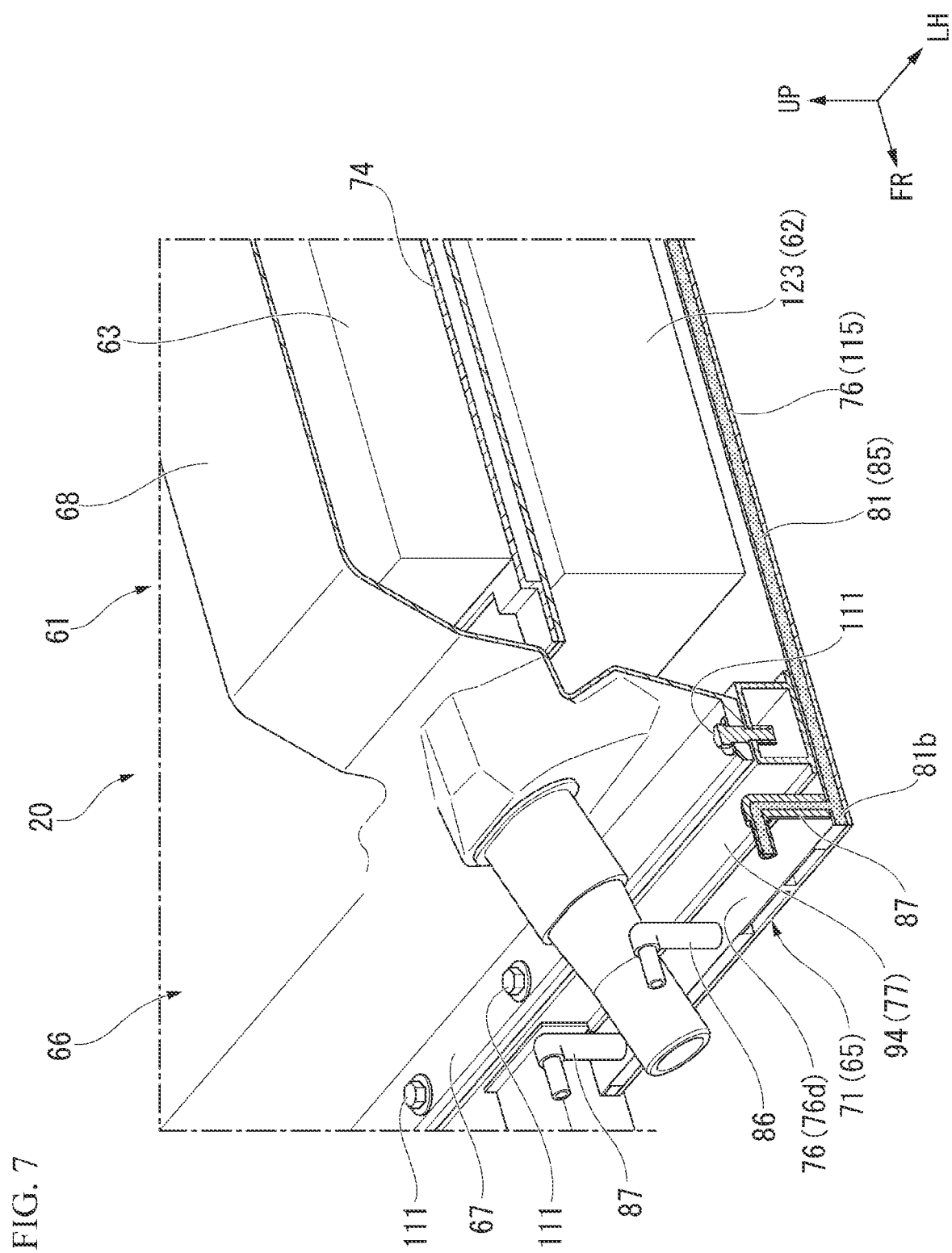
FIG. 7 is a cross-sectional view illustrating a cooling passage of the vehicle-mounted battery pack of one embodiment.
Figure 8:
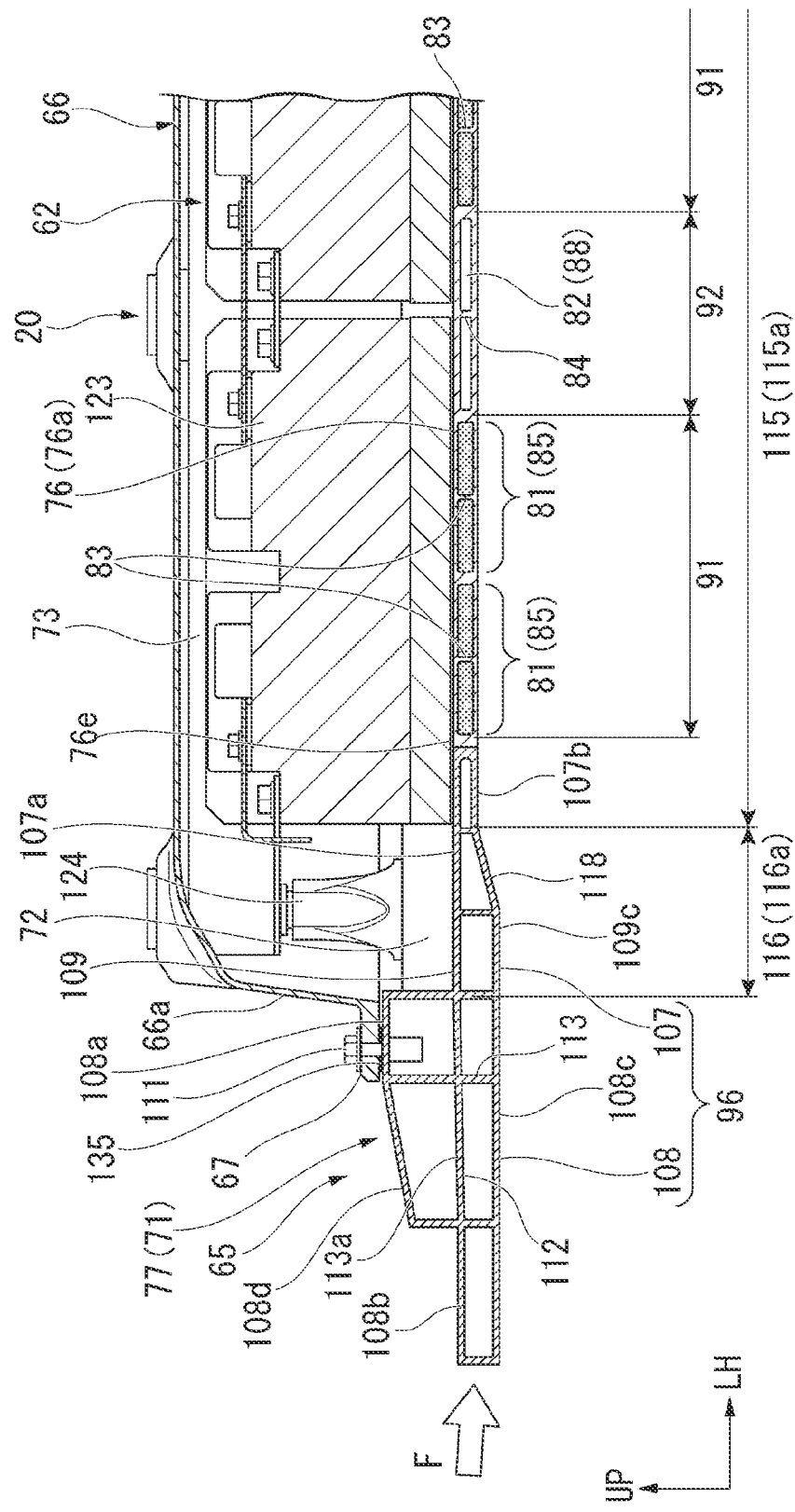
FIG. 8 is an enlarged cross-sectional view of a portion VIII in FIG. 5.

As illustrated in FIGS. 5, 7, and 8, a plurality of (eight in the embodiment) first hollow chambers (hollow chambers) 81 and a plurality of (three in the embodiment) second hollow chambers (other hollow chambers) 82 are integrally formed with the floor part 76 in the floor part 76 between the front surface 76a and the back surface 76b.

The plurality of first hollow chambers 81 extends in the front-rear direction of the vehicle body inside the floor part 76. The plurality of first hollow chambers 81 is provided at a plurality of places inside the floor part 76 in a state where a pair of first hollow chambers 81 is put together to be adjacent in the vehicle width direction. The pairs of first hollow chambers 81 put together are provided at two places on the floor part 76 near the center in the vehicle width direction and two places on the left and right sides in the vehicle width direction at intervals in the vehicle width direction.

Note that in the first hollow chamber 81, for example, a partition wall 83 is formed at the center in the vehicle width direction in order to ensure the strength and rigidity of the floor part 76.

As illustrated in FIGS. 5 and 6, in the pair of first hollow chambers 81, for example, at a rear end 76c of the floor part 76, a rear end 81a of one first hollow chamber 81 communicates with a rear end 81a of the other first hollow chamber 81. Further, in the pair of first hollow chambers 81, for example, at a front end 76d of the floor part 76, an opening is formed in a front end 81b of one first hollow chamber 81, and an opening is formed in a front end 81b (see also FIG. 7) of the other first hollow chamber 81. That is, the pair of first hollow chambers 81 is formed in a U shape in plan view.

A cooling passage (cooling water path) 85 is formed in a U shape (including a substantially U shape) in plan view by the pair of first hollow chambers 81. That is, a plurality of (four in the embodiment) cooling passages is formed by the plurality of first hollow chambers 81 (eight in the embodiment). Thus, the cooling passages 85 integrally extend in the front-rear direction of the vehicle body inside the floor part 76. Note that it is sufficient if at least one cooling passage 85 is provided, and the number of cooling passages 85 can be arbitrarily selected.

In the cooling passage 85, a water supply connector (cooling water connector) 86 (see also FIG. 7) for supplying water communicates with the opening (water supply port) of one first hollow chamber 81 at the front end 76d of the floor part 76. Further, a water drain connector (cooling water connector) 87 (see also FIG. 7) for draining water communicates with the opening (water drain port) of the other first hollow chamber 81 at the front end 76d of the floor part 76.

Therefore, for example, cooling water cooled by a radiator (not illustrated) of the vehicle Ve (see FIG. 1) can be guided from the water supply connector 86 to the one cooling passage 85 as indicated by an arrow, and can be guided from a rear end 85a of one cooling passage 85 to a rear end 85a of the other cooling passage 85 as indicated by an arrow. Further, the cooling water guided to the rear end 85a of the other cooling passage 85 can be guided to the water drain connector 87 via the other cooling passage 85 as indicated by an arrow. Furthermore, the cooling water guided to the water drain connector 87 can be returned from the water drain connector 87 to the radiator. Thus, the battery module 62 can be cooled by the cooling water guided to the cooling passage 85. That is, the floor part 76 also serves as a water jacket of the battery pack 20.

As illustrated in FIGS. 5 and 8, the second hollow chamber 82 is integrally formed inside the floor part 76. The second hollow chamber 82 is formed in a state of being isolated (partitioned) in the vehicle width direction from the first hollow chamber 81 forming the cooling passage 85. The second hollow chamber 82 extends in the vehicle front-rear direction at the center of the floor part 76 in the vehicle width direction and between the pair of cooling passages 85. Further, the second hollow chamber 82 extends in the vehicle front-rear direction on the left side of the floor part 76 in the vehicle width direction and between the pair of cooling passages 85. Furthermore, the second hollow chamber 82 extends in the vehicle front-rear direction on the right side of the floor part 76 in the vehicle width direction and between the pair of cooling passages 85. Note that in the second hollow chamber 82, for example, a partition wall 84 is formed at the center in the vehicle width direction in order to ensure the strength and rigidity of the floor part 76.

A plurality of (three in the embodiment) cavities 88 is formed by the plurality of second hollow chambers 82. The number of cavities 88 can be arbitrarily selected. By forming the plurality of cavities 88 in the floor part 76, a cooling region 91 formed by the cooling passages 85 and a cavity region 92 formed by the cavities 88 are provided in the floor part 76. The cooling region 91 and the cavity region 92 are alternately disposed in the vehicle width direction. Therefore, a battery disposition region 115 (that is, the battery module 62) to be described below can be efficiently cooled by the cooling region 91. The frame body 77 is provided around the floor part 76.

As illustrated in FIG. 6, the frame body 77 includes a front frame (front-side frame) 94, a rear frame (rear-side frame) 95, a right frame (side frame) 96, a left frame (side frame) 97, a right inclined frame 98, and a left inclined frame 99.

As illustrated in FIGS. 2 and 6, the front frame 94 is provided at a front end (vehicle body front side) 76d of the floor part 76 in the front-rear direction of the vehicle body. On the front frame 94, a right front support bracket 102 and a left front support bracket 102 protrude toward the front of the vehicle body. The right front support bracket 102 is attached to a right branch (bottom of the vehicle) 38 extending from a rear portion 36a of the right front side frame 36. The left front support bracket 102 is attached to a left branch (bottom of the vehicle) 38 extending from a rear portion 36a of the left front side frame 36. That is, the front frame 94 is attached to the right branch 38 and the left branch 38.

The rear frame 95 is provided at a rear end (vehicle body rear side) 76c of the floor part 76 in the front-rear direction of the vehicle body. On the rear frame 95, a right rear support bracket 104 and a left rear support bracket 104 protrude toward the rear of the vehicle body. The right rear support bracket 104 is attached to the fourth floor cross member (the bottom of the vehicle) 47 via a right coupling bracket 105 (see also FIG. 5). The left rear support bracket 104 is attached to the fourth floor cross member 47 via a left coupling bracket 105. That is, the rear frame 95 is attached to the fourth floor cross member 47.

Figure 9:
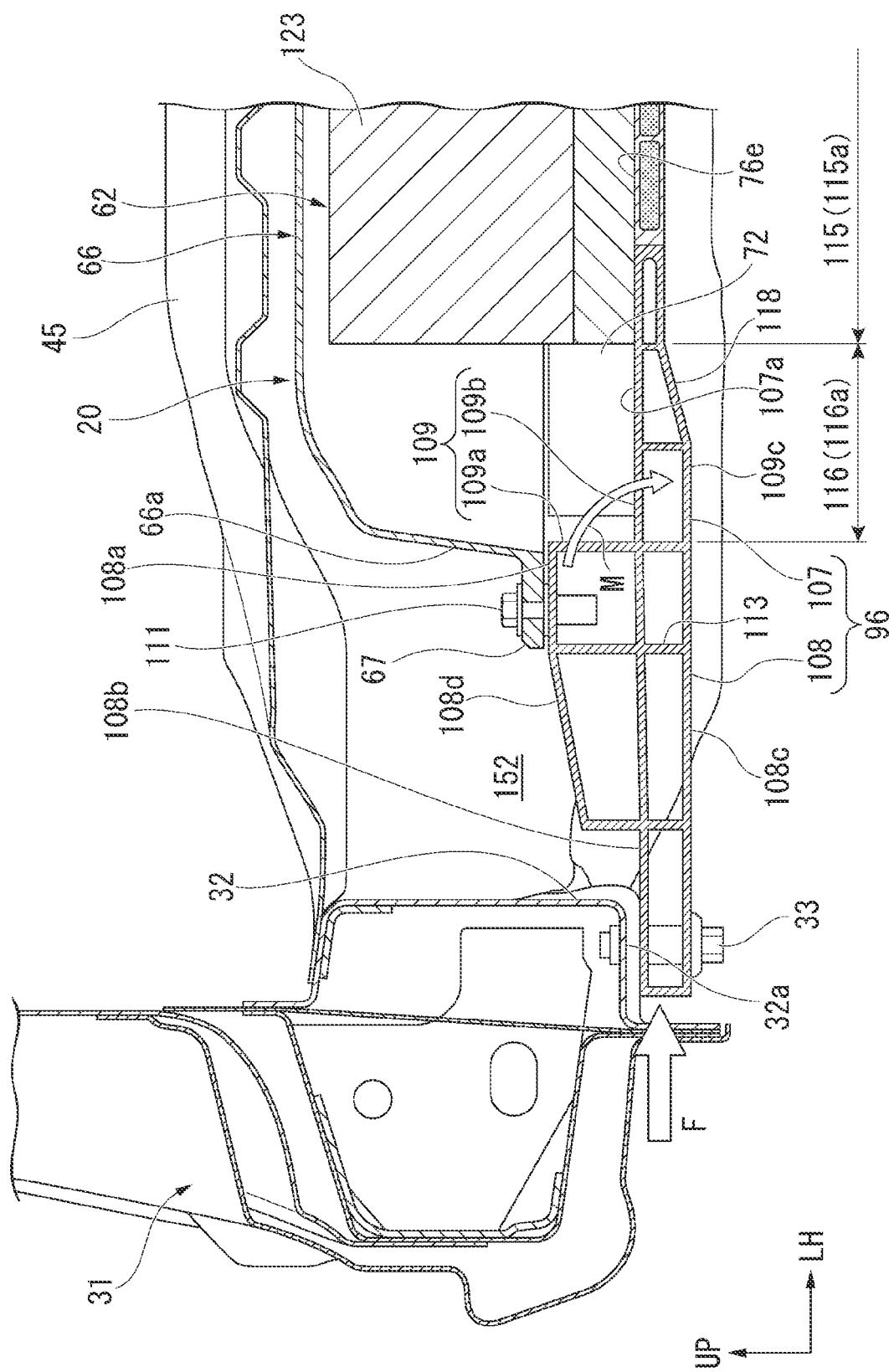
FIG. 9 is a cross-sectional view taken along line IX-IX of FIG. 1.

As illustrated in FIGS. 6, 8, and 9, the right frame 96 is provided along a right side portion (right side) 76e of the floor part 76 in the vehicle width direction. For example, the right frame 96 is attached to a bottom (bottom of the vehicle) 32a of an inner panel 32 of the right side sill 31 by a fastening bolt 33 from below. Note that the right frame 96 will be described below in detail.

As illustrated in FIGS. 2, 5, and 6, the left frame 97 is provided along a left side portion (left side) 76f of the floor part 76 in the vehicle width direction. The left frame 97 is attached to a bottom (bottom of the vehicle) 32a of an inner panel 32 of the left side sill 31 from below. The right inclined frame 98 is coupled in an inclined manner to a rear end of the right frame 96 and a right end of the rear frame 95. The left inclined frame 99 is coupled in an inclined manner to a rear end of the left frame 97 and a left end of the rear frame 95.

The frame body 77 is formed in a rectangular frame shape (including a substantially rectangular frame shape) in plan view by the front frame 94, the rear frame 95, the left frame 97, the right frame 96, the right inclined frame 98, and the left inclined frame 99. The case cover 66 (see also FIG. 4) is attached to the frame body 77.

As illustrated in FIGS. 8 and 9, the right frame 96 includes a frame floor 107 and a projection (extension) 108. The frame floor 107 is provided along the right side portion 76e of the floor part 76, and is provided between the right side portion 76e of the floor part 76 and a right wall 66a of the case cover 66. A front surface 107a of the frame floor 107 is formed to be flush with the front surface 76a of the floor part 76.

The projection 108 projects outward in the vehicle width direction (that is, the right side sill 31 side) from the right wall 66a of the case cover 66. The projection 108 includes a cover attachment portion (upper portion) 108a, a side sill attachment portion (outer portion) 108b, and a projecting inclined portion 108d.

The cover attachment portion 108a is formed at an upper portion of the projection 108 on the battery module side. An attachment portion 67 (see also FIG. 7) of the case cover 66 is fixed to the cover attachment portion 108a from above by a fastening bolt 111.

The side sill attachment portion 108b is formed at an outer portion of the projection 108 on the side sill 31 side. The side sill attachment portion 108b is fixed to a bottom 32a of an inner panel (inner side of the vehicle in the vehicle width direction) 32 of the right side sill 31 from below by the fastening bolt 33.

The projecting inclined portion 108d is formed, for example, between the side sill attachment portion 108b and the cover attachment portion 108a in the upper portion of the projection 108. For example, the projecting inclined portion 108d is inclined upward from the outer side in the vehicle width direction (that is, the side sill attachment portion 108b side) toward the inner side in the vehicle width direction (the cover attachment portion 108a side).

A plurality of (multiple) frame hollow chambers (hollow chambers) 112 is integrally formed by a partition wall 113 inside the right frame 96. The plurality of frame hollow chambers 112 extends in the front-rear direction of the vehicle body inside the right frame 96.

The right frame 96 has, for example, a thin portion 113a at the center of the cross section of the projection 108. The thin portion 113a is positioned at the center of the cross section of the projection 108 of the partition wall 113 and is formed horizontally in the vehicle width direction.

Further, the right frame 96, in particular, a lower portion (lower surface, lower portion of the side frame) 108c of the projection 108, is disposed at a position lower than a lower portion (lower surface) 115a of the battery disposition region 115 in an up-down direction.

As illustrated in FIGS. 5 and 6, the left frame 97 is formed substantially bilaterally symmetric with the right frame 96. Therefore, hereinafter, each portion forming the left frame 97 is denoted by the same reference numbers as that of the right frame 96, and a detailed description thereof is omitted.

Here, in the battery tray 71, a tray floor 75 is formed by the floor part 76, the frame floor 107 of the right frame 96, and the frame floor 107 of the left frame 97. The tray floor 75 includes the battery disposition region 115, a right impact-absorbing region (impact-absorbing region) 116, and a left impact-absorbing region (impact-absorbing region) 116.

The battery disposition region 115 is positioned at the center in the vehicle width direction, in which the entire battery module 62 is placed. The plurality of (multiple) first hollow chambers 81 (that is, the cooling passages 85) and the plurality of (multiple) second hollow chambers 82 (that is, the cavities 88) are integrally formed inside the battery disposition region 115.

As illustrated in FIGS. 8 and 9, the right impact-absorbing region 116 is positioned between the battery disposition region 115 and the right wall 66a (that is, the projection 108) of the case cover 66 on an outer side of the battery disposition region 115 in the vehicle width direction. The plurality of frame hollow chambers 112 (that is, cavities) is integrally formed inside the right impact-absorbing region 116.

Further, the projection 108 is formed such that the wall thickness of the partition wall 113 forming the frame hollow chambers 112 is thinner than that of the right impact-absorbing region 116. Furthermore, the impact-absorbing region 116 includes, for example, an easily deformable portion 118 in a lower portion 116a. The easily deformable portion 118 is formed of, for example, an inclined portion inclined upward from the outer side in the vehicle width direction (that is, the lower portion 108c side of the projection 108) toward the inner side in the vehicle width direction.

Note that, in the embodiment, an example in which the easily deformable portion 118 is formed of the inclined portion will be described, but it is not limited thereto. As another example, for example, the partition wall 113 corresponding to the easily deformable portion 118 may have a thin portion that is thinner than that of the other partition walls 113 to form the easily deformable portion 118. Alternatively, the inclined portion of the embodiment forming the easily deformable portion 118 may be thinner than the wall thickness of the other partition walls 113.

Further, the right frame 96 has a closed cross-section 109 having an L-shape between the projecting inclined portion 108d and the easily deformable portion 118. The closed cross-section 109 having an L-shape includes a vertically closed cross-section 109a and a horizontally closed cross-section 109b. Hereinafter, the closed cross-section 109 having an L-shape may be referred to as an "L-shaped closed cross-section 109".

The vertically closed cross-section 109a is vertically erected from the lower portion 108c of the projection 108 toward the cover attachment portion 108a (that is, the top). The cover attachment portion 108a is located at an inner end of the projecting inclined portion 108d.

The horizontally closed cross-section 109b protrudes inward in the vehicle width direction from a lower portion (that is, the lower portion 108c of the projection 108) of the vertically closed cross-section 109a toward the easily deformable portion 118. An inner end 109c of the horizontally closed cross-section 109b is located at an outer end of the easily deformable portion 118.

As illustrated in FIGS. 5 and 6, the left impact-absorbing region 116 is formed substantially bilaterally symmetric with the right impact-absorbing region 116. Therefore, a detailed description of the left impact-absorbing region 116 is omitted. Note that, hereinafter, the right impact-absorbing region 116 may be abbreviated as an "impact-absorbing region 116".

The tray floor 75 is provided with the lower cross member 72. The lower cross member 72 extends in the vehicle width direction at the center (middle) of the tray floor 75 in the front-rear direction of the vehicle body and below the battery module 62 (plurality of batteries 123). The lower cross member 72 is attached to the tray floor 75 from above, for example, by a fastening bolt 127 (described below in FIG. 11). In this state, the lower cross member 72 is coupled to the right frame 96 and the left frame 97. The lower cross member 72 will be described in detail below.

In the battery disposition region 115 of the tray floor 75, a driving battery module 62 (see FIG. 4) is placed in a front region on the vehicle body front side of the lower cross member 72 and in a rear region on the vehicle body rear side of the lower cross member 72.

(Battery Module)

As illustrated in FIGS. 4 to 6, the battery module 62 includes, for example, a first module 121 placed in a front region of the battery disposition region 115 and a second module 122 placed in a rear region of the battery disposition region 115.

In the first module 121, a plurality of batteries 123 is arranged in the vehicle width direction in the front region. The batteries 123 are formed, for example, in a longitudinally rectangular shape with a plurality of battery cells (not illustrated) being stacked in a longitudinal direction. Hereinafter, the batteries 123 that are longitudinally long may be referred to as "longitudinal batteries 123". Further, disposing the longitudinal batteries 123 longitudinally means disposing the batteries 123 with a longitudinal direction oriented in the front-rear direction of the vehicle body.

That is, the first module 121 is arranged in the vehicle width direction in the front region of the battery disposition region 115 in a state where the plurality of longitudinal batteries 123 is disposed longitudinally. Further, the second module 122 is arranged in the vehicle width direction in the rear region of the battery disposition region 115 in a state where the plurality of longitudinal batteries 123 is disposed longitudinally.

Thus, the lower cross member 72 is disposed between the first module 121 and the second module 122 in the front-rear direction of the vehicle body.

In the embodiment, an example in which a pair of the first module 121 and the second module 122 is disposed in the front-rear direction of the vehicle body has been described, but it is not limited thereto. As another example, for example, three or more rows of the first module 121 and the second module 122 may be disposed in the front-rear direction of the vehicle body.

Figure 10:
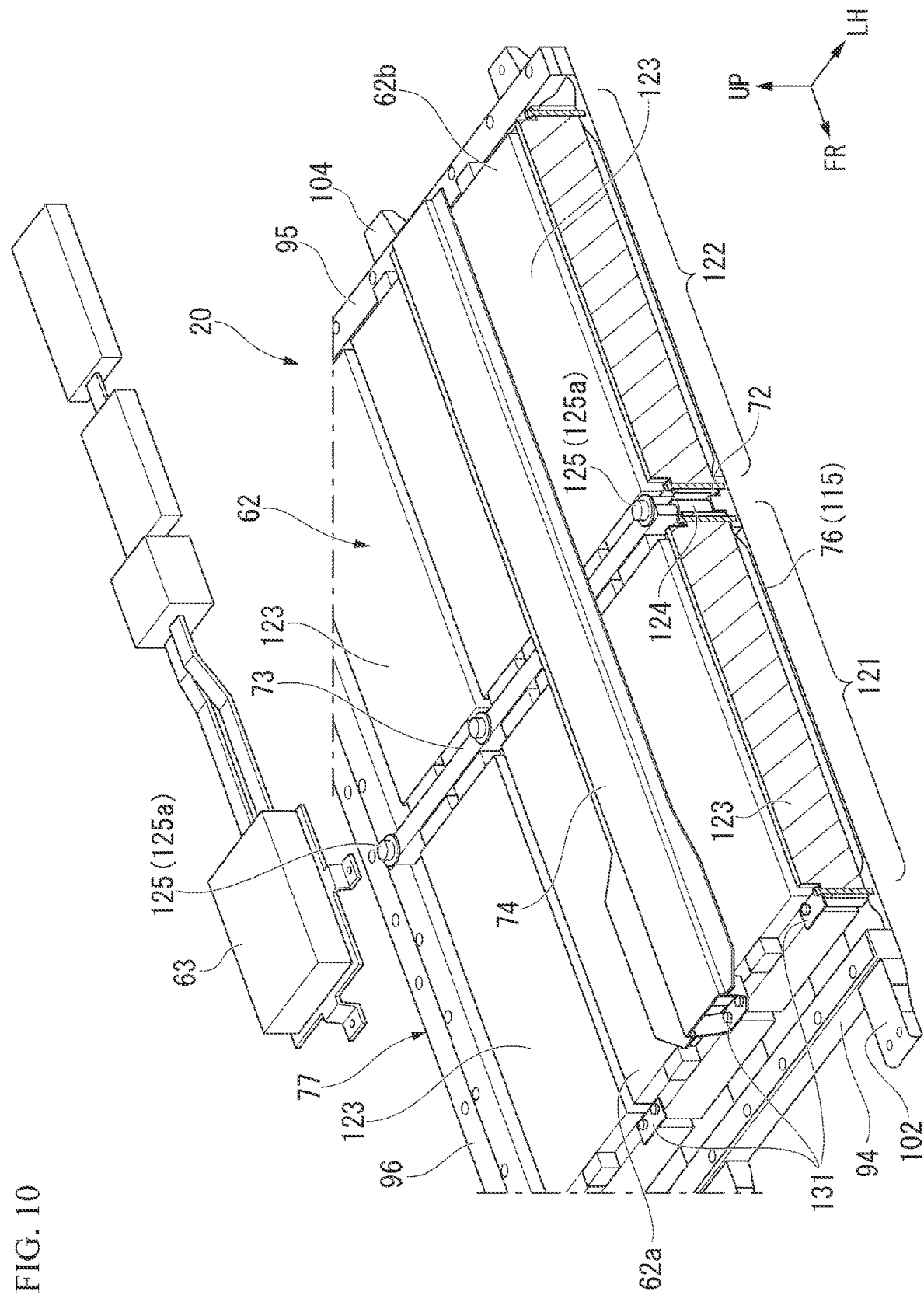
FIG. 10 is an exploded perspective view of an auxiliary battery disassembled from the case body of one embodiment.
Figure 11:
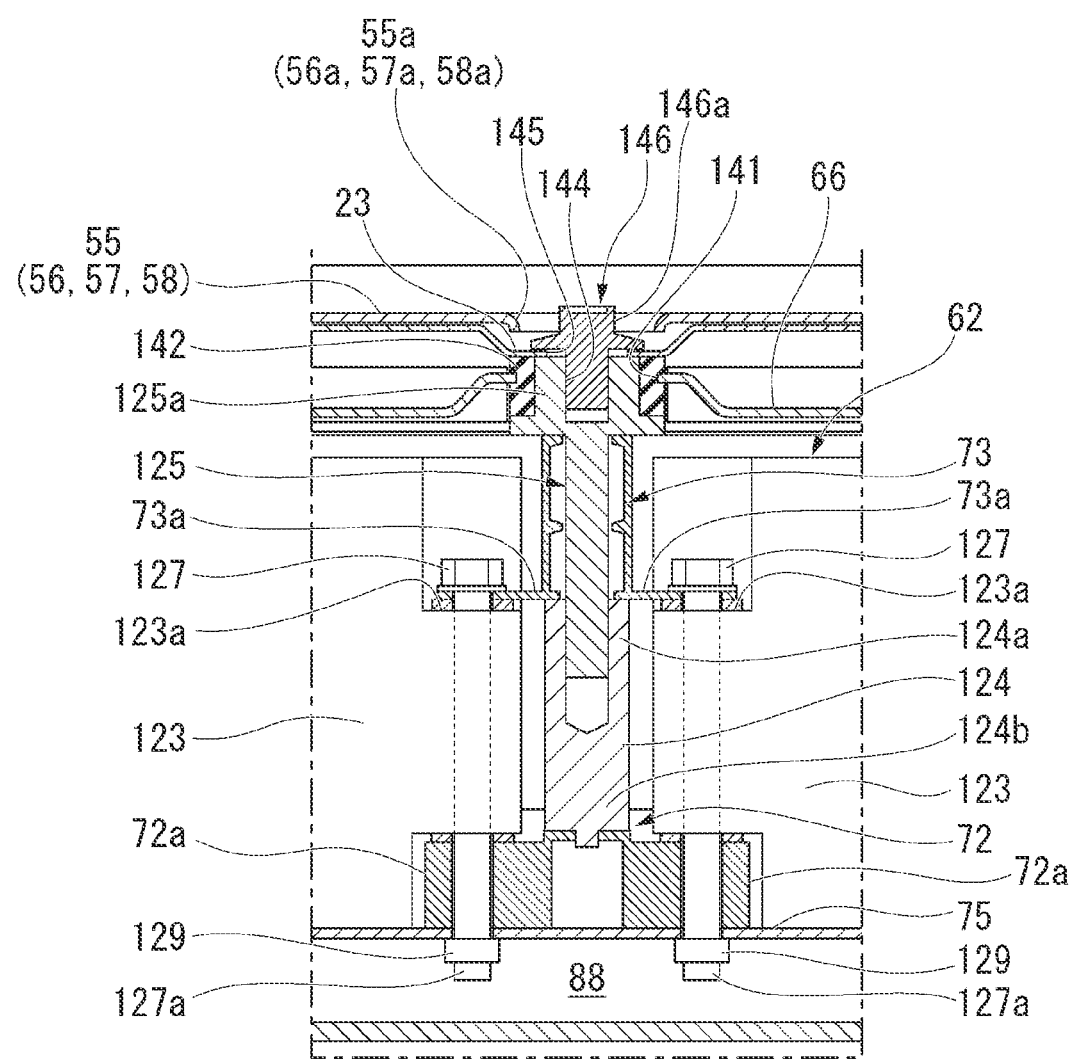
FIG. 11 is a cross-sectional view of the vehicle of FIG. 1 taken along line XI-XI.

As illustrated in FIGS. 3, 10, and 11, the upper cross member 73 is provided between the first module 121 and the second module 122 and above the battery module 62 (plurality of batteries 123). The upper cross member 73 extends in the vehicle width direction along the lower cross member 72 above the lower cross member 72.

The upper cross member 73 is placed on an upper end 124a of an upper and lower coupling collar 124 and a step 123a of the battery 123. A lower end 124b of the upper and lower coupling collar 124 is coupled to the lower cross member 72.

In this state, the fastening bolt (fastening member) 127 penetrates a flange 73a of the upper cross member 73, the battery 123, an attachment portion 72a of the lower cross member 72, and an upper portion of the tray floor 75 from above. A threaded portion 127a of the penetrating fastening bolt 127 protrudes into the cavity 88 and is fastened to a fastening nut 129. Note that, in the embodiment, the fastening bolt 127 is exemplified as the fastening member, but it is not limited thereto. As another example, for example, a rivet or the like may be used as the fastening member.

Thus, the lower cross member 72 is fixed (attached) to the tray floor 75 in the cavity 88 by the fastening bolt 127 and the fastening nut 129. Further, the lower cross member 72 is fastened to the plurality of batteries 123 (that is, the battery module 62) by the fastening bolts 127 and the fastening nuts 129 in the cavities 88. Furthermore, the upper cross member 73 is coupled to the lower cross member 72 and the tray floor 75 by a fastening bolt 125, the upper and lower coupling collar 124, and the fastening nut 129.

In addition, the plurality of batteries 123 (battery module 62) is sandwiched in the up-down direction between the upper cross member 73 and the attachment portions 72a of the lower cross member 72 in the cavities 88. In this state, the plurality of batteries 123 is fastened to the tray floor 75 by the fastening bolts 127 and the fastening nuts 129. Thus, the plurality of batteries 123 is fixed from above by the upper cross member 73. That is, the upper cross member 73 fixes the plurality of batteries 123 disposed in the front-rear direction of the vehicle body from above and fixes the plurality of batteries 123 disposed in the vehicle width direction from above at the center of the battery module 62 in the front-rear direction of the vehicle body.

In other words, among the plurality of longitudinal batteries 123 arranged in the vehicle front-rear direction, the ends on the center side in the front-rear direction of the vehicle body are fixed to the battery tray 71 by the lower cross member 72 and the upper cross member 73.

Further, the plurality of batteries 123 disposed in the vehicle width direction is coupled to each other at a front end 62a of the battery module 62 by front coupling brackets 131. Furthermore, the plurality of batteries 123 disposed in the vehicle width direction is coupled to each other at a rear end 62b of the battery module 62 by rear coupling brackets (not illustrated).

Thus, the plurality of batteries 123 (that is, the battery module 62) is placed in the battery disposition region 115, and the battery module 62 is fixed from above by the upper cross member 73 at the center in the front-rear direction of the vehicle body (see also FIG. 4). Thus, the battery module 62 (that is, the plurality of longitudinal batteries 123) is stably fixed, and in addition, is integrally coupled in a state where rigidity of the battery module 62 is ensured.

(Auxiliary Battery)

As illustrated in FIGS. 4 and 10, the upper deck 74 is provided at the center in the vehicle width direction at above the battery module 62.

The upper deck 74 is formed in a band shape and extends in the front-rear direction of the vehicle body from the front end 62a to the rear end 62b of the battery module 62. The upper deck 74 is provided with an auxiliary battery 63 such as a high-voltage junction board and an electronic control unit (controller, ECU).

A high-voltage junction box is, for example, an auxiliary device that supplies electricity of the driving battery module 62 to a driving motor (not illustrated). The ECU is, for example, a battery management unit that controls discharge and charge between the driving battery module 62 and the driving motor.

As illustrated in FIGS. 4, 6, and 8, the battery module 62, the auxiliary battery 63, and the like are accommodated (disposed) in the case body 65. In this state, the case cover 66 is attached to the frame body 77 by the fastening bolt 111 from above via a sealing member 135.

Thus, the inside of the battery case 61 is formed to be a sealed space by the battery tray 71 and the case cover 66. The battery module 62 is housed in the sealed space of the battery case 61 (see also FIG. 5).

Further, in the case cover 66, a raised portion 68 extends in the front-rear direction of the vehicle body along the upper deck 74 at the center in the vehicle width direction. The upper deck 74, the auxiliary battery 63, and the like are housed in the raised portion 68 from below. In this state, the battery pack 20 is assembled and attached under the floor of the vehicle Ve (see FIG. 1).

(Assembly of the Battery Pack 20 Under the Floor of the Vehicle)

As illustrated in FIGS. 2, 3, and 6, the right frame 96 of the battery pack 20 is fixed to the inner panel 32 of the right side sill 31 from below. The left frame 97 is fixed to the inner panel 32 of the left side sill 31 from below.

The front frame 94 is fixed to the right branch 38 and the left branch 38 via the right front support bracket 102 and the left front support bracket 102. The rear frame 95 is fixed to the fourth floor cross member 47 via the right rear support bracket 104, the right coupling bracket 105, the left rear support bracket 104, and the left coupling bracket 105.

As illustrated in FIGS. 3 and 11, a head 125a of the fastening bolt 125 passes through a through-hole 141 of the case cover 66 and is in contact with the floor panel 23 at above. Further, a rubber member 142 provided on the head 125a passes through the through-hole 141 of the case cover 66 and is in contact with the floor panel 23 at above.

A female screw 144 of the head 125a is disposed below in line with an attachment hole 145 of the floor panel 23. A fastening bolt 146 is screwed to the female screw 144 of the head 125a through the attachment hole 145 of the floor panel 23. A head 146a of the fastening bolt 146 protrudes upward from through-holes 55a to 58a at the top of the first to fourth floor vertical frames 55 to 58.

Here, left and right flanges of the first to fourth floor vertical frames 55 to 58 are joined to the floor panel 23. Thus, the upper cross member 73 and the lower cross member 72 of the battery pack 20 are fixed to the first to fourth floor vertical frames 55 to 58 via the floor panel 23. Therefore, the battery pack 20 is assembled under the floor of the vehicle Ve in a state of being stably fixed below the floor panel 23.

As described above, with the vehicle-mounted battery pack 20 according to the embodiment, the following operation and effect can be obtained.

That is, as illustrated in FIGS. 6, 8, and 9, in the battery tray 71, the impact-absorbing region 116 is provided on an outer side of the battery disposition region 115 in the vehicle width direction. Therefore, for example, when a load F (hereinafter, sometimes referred to as side collision load F) is input from the side of the vehicle body due to the side collision, the side collision load F can be absorbed by the impact-absorbing region 116 to protect the battery module 62. Thus, for example, it is not necessary to reinforce the outer portion of the vehicle Ve (specifically, the side sill 31) more than necessary, and the weight of the vehicle Ve can be reduced.

Furthermore, since the floor part 76 (specifically, the battery disposition region 115) also serves as a water jacket, the floor part 76 and the cooling passage 85 can be integrally molded (formed). Thus, the weight and cost of the battery pack 20 can be reduced.

Further, the right frame 96 (specifically, the projection 108) is formed to be thinner than the impact-absorbing region 116, and an inclined portion is formed as the easily deformable portion 118 in the lower portion 116a of the impact-absorbing region 116. Therefore, the impact energy can be favorably absorbed by deforming the impact-absorbing region 116 downward and crushing (compressing) the right projection 108 using the side collision load F input by the side collision.

Thus, it is possible to reduce the weight of the right projection 108 and the impact-absorbing region 116 (that is, the battery pack 20), and furthermore it is possible to enhance the impact energy absorption effect.

Furthermore, for example, by ensuring the wall thickness of the impact-absorbing region 116, the deformation of the impact-absorbing region 116 can be suitably suppressed to be small. Thus, it is possible to favorably ensure protection of the battery module 62 against the side collision load F input by the side collision.

Thus, the battery module 62 can be protected by the right frame 96 (specifically, the projection 108) and the impact-absorbing region 116, it is not necessary to reinforce the vehicle pack more than necessary, and the weight of the vehicle pack can be reduced.

In addition, in the right frame 96, the thin portion 113a is formed at the center of the cross section of the projection 108. Therefore, the projection 108 can be crushed from the center of the cross section by the side collision load F input by the side collision. Thus, crushing of the projection 108 due to the side collision load F can be generated across the projection 108, and the impact energy absorption effect can be enhanced.

Figure 12:
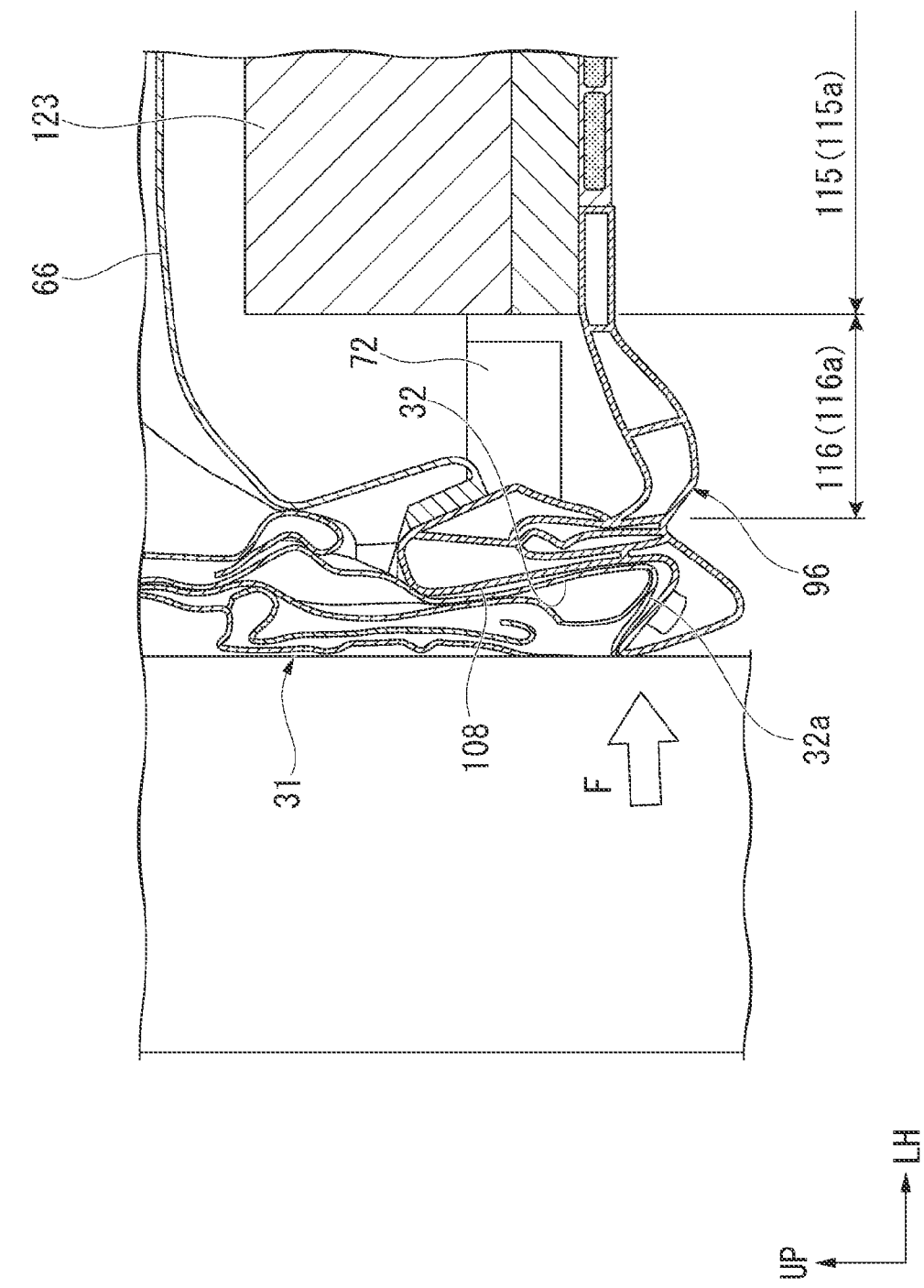
FIG. 12 is a cross-sectional view for explaining an example in which impact energy is absorbed by a right frame in the case body of one embodiment.

As illustrated in FIGS. 4, 9, and 12, in the right frame 96, in particular, the lower portion (lower surface) 108c of the projection 108 is disposed at a position lower than the lower portion (lower surface) 115a of the battery disposition region 115 in the up-down direction. Therefore, when the projection 108 of the right frame 96 is crushed by the side collision load F input by the side collision, the impact-absorbing region 116 can be deformed downward.

Accordingly, when the projection 108 of the right frame 96 is crushed, in particular, the lower portion 116a of the impact-absorbing region 116 can be prevented from interfering with the lower portion 115a of the battery disposition region 115. As described above, the impact-absorbing region 116 is favorably deformed downward, and the projection 108 is favorably crushed, so that the impact energy absorption effect can be enhanced.

Further, the case cover 66 is fixed to the cover attachment portion 108a on the battery module 62 side of the projection 108 of the right frame 96. Furthermore, the side sill attachment portion 108b of the projection 108 is fixed to the bottom 32a of the inner panel 32 of the side sill 31. Therefore, above the right frame 96 (specifically, the projection 108), a deformation allowing space 152 that allows crushing of the projection 108 can be ensured between the cover attachment portion 108a and the side sill attachment portion 108b. Thus, the projection 108 can be favorably crushed by the side collision load F input by the side collision, and the impact energy absorption effect can be enhanced.

Further, as illustrated in FIGS. 3 to 5, the battery module 62 is placed in the battery disposition region 115 of the battery tray 71, and the cooling passages 85 are extended in the front-rear direction of the vehicle body inside the battery disposition region 115. Thus, the battery disposition region 115 (floor part 76) also serves as a water jacket of the battery pack 20. Thus, for example, the water supply connector 86 and the water drain connector 87 that allow the cooling passage to communicate with a cooling radiator (not illustrated) can be disposed on a vehicle body front side of the battery module 62. Therefore, the water supply connector 86, the water drain connector 87, and the cooling passage 85 (for example, the cooling pipe) can be prevented from protruding outward in the vehicle width direction of the battery module 62.

Thus, at above the projection 108, the water supply connector 86, the water drain connector 87, and the cooling passage 85 (see FIG. 7) can be removed from the deformation allowing space 152 (see FIG. 9) between the cover attachment portion 108a and the side sill attachment portion 108b. Thus, when the right frame 96 (particularly, the projection) is crushed by the side collision load F, damage to the water supply connector 86, the water drain connector 87, and the cooling passage 85 can be suppressed, and water leakage from the water supply connector 86, the water drain connector 87, and the cooling passage 85 (see FIG. 7) can be suppressed.

Furthermore, as illustrated in FIGS. 9 and 12, the projecting inclined portion 108d is formed in the upper portion of the projection 108, and the easily deformable portion 118 (inclined portion in the embodiment) is formed in the lower portion 115a of the impact-absorbing region 116. The projecting inclined portion 108d and the inclined portion of the easily deformable portion 118 are inclined upward from the outer side in the vehicle width direction toward the inner side in the vehicle width direction. Further, the L-shaped closed cross-section 109 is provided between the projecting inclined portion 108d and the easily deformable portion 118.

Furthermore, the vertically closed cross-section 109a of the L-shaped closed cross-section 109 is vertically erected toward the inner end (that is, the cover attachment portion 108a) of the projecting inclined portion 108d. Further, the horizontally closed cross-section 109b of the L-shaped closed cross-section 109 protrudes inward in the vehicle width direction from the lower portion (that is, the lower portion 108c of the projection 108) of the vertically closed cross-section 109a toward the easily deformable portion 118.

Therefore, for example, moment M can be generated in the L-shaped closed cross-section 109 by the side collision load F input by the side collision. The moment M moves the top (that is, the cover attachment portion 108a) of the vertically closed cross-section 109a of the L-shaped closed cross-section 109 inward in the vehicle width direction, and moves the inner end 109c of the horizontally closed cross-section 109b downward.

Specifically, for example, in the right frame 96 on the right side of the vehicle body, the clockwise moment M can be generated in the L-shaped closed cross-section 109 by the side collision load F input by the side collision when viewed from the front side of the vehicle body. Thus, the easily deformable portion 118 of the impact-absorbing region 116 can be folded downward reliably. Therefore, the projection 108 and the impact-absorbing region 116 can be favorably crushed by the side collision load F input by the side collision, and the impact energy absorption effect can be enhanced.

In addition, as illustrated in FIGS. 3, 4, and 11, the plurality of longitudinal batteries 123 constituting the battery module 62 is arranged in the vehicle front-rear direction. Further, the lower cross member 72 is provided below the battery module 62, and the upper cross member 73 is provided above the battery module 62. Furthermore, among the plurality of longitudinal batteries 123 arranged in the vehicle front-rear direction, the ends on the center side in the front-rear direction of the vehicle body are fixed to the battery tray 71 by the lower cross member 72 and the upper cross member 73. Thus, the plurality of longitudinal batteries 123 (that is, the battery module 62) can be stably fixed to the battery disposition region 115 by the lower cross member 72 and the upper cross member 73.

Furthermore, the longitudinal batteries 123 are arranged in the vehicle front-rear direction, and the lower cross member 72 and the upper cross member 73 are provided below and above the battery module 62, respectively. Therefore, the width of the battery module 62 (that is, the battery disposition region 115) in the vehicle width direction can be suppressed to be narrow. Thus, a space for forming the impact-absorbing region 116 can be ensured between the battery disposition region 115 and the projection 108 (see also FIG. 8) of the right frame 96. Therefore, for example, the impact-absorbing region 116 can be suitably deformed by the side collision load F input by the side collision, and the battery module 62 can be protected from the side collision load F by the impact-absorbing region 116.

Note that the technical scope of the present invention is not limited to the above embodiment, and various changes can be made without departing from the scope of the present invention.

Moreover, it is possible to appropriately replace the constituent elements in the embodiment with well-known constituent elements without departing from the scope of the present invention, and the above-described modifications may be appropriately combined.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle-mounted battery pack comprising:
   a battery tray including
      a floor part disposed at a floor of a vehicle, and
      a frame body having side frames that are provided on at least left and right sides of the floor part in a vehicle width direction and that are attached to the vehicle,
   wherein the battery tray includes:
   a battery disposition region provided at a center in the vehicle width direction and on which a battery module consisted by a plurality of batteries is placed, and
   an impact-absorbing region provided on an outer side of the battery disposition region in the vehicle width direction, and
   wherein the side frame is formed to be thinner than the impact-absorbing region, and
   the impact-absorbing region includes an easily deformable portion, which is formed of an inclined portion, at a lower portion thereof,
   wherein a lid is fixed to an upper portion of the side frames on the battery module side, and the side frames include a projection projecting outward from the lid in the vehicle width direction,
   an outer portion of the projection is fixed at an outer side of the vehicle in the vehicle width direction,
   the vehicle-mounted battery pack comprising:
   a projecting inclined portion at an upper portion of the projection, the projecting inclined portion being inclined upward from an outer side in the vehicle width direction toward an inner side in the vehicle width direction; and
   an L-shaped closed cross-section between the projecting inclined portion and the easily deformable portion,
   wherein the L-shaped closed cross-section includes:
      a vertically closed cross-section vertically erected toward the projecting inclined portion, and
      a horizontally closed cross-section projecting inward in the vehicle width direction from a lower portion of the vertically closed cross-section toward the easily deformable portion.

2. The vehicle-mounted battery pack according to claim 1, wherein
   the side frames have a thin portion at a center of a cross section thereof.

3. The vehicle-mounted battery pack according to claim 1, wherein
   a lower portion of the side frames is disposed at a position lower than a lower portion of the battery disposition region in an up-down direction.

4. A vehicle-mounted battery pack comprising:
   a battery tray including
      a floor part disposed at a floor of a vehicle, and a frame body having side frames that are provided on at least left and right sides of the floor part in a vehicle width direction and that are attached to the vehicle, wherein the battery tray includes:

a battery disposition region provided at a center in the vehicle width direction and on which a battery module consisted by a plurality of batteries is placed, and an impact-absorbing region provided on an outer side of the battery disposition region in the vehicle width direction, and wherein the side frame is formed to be thinner than the impact-absorbing region, and the impact-absorbing region includes an easily deformable portion, which is formed of an inclined portion, at a lower portion thereof, wherein a plurality of longitudinal batteries constituting the battery module is arranged in the battery disposition region with a longitudinal direction thereof oriented in a vehicle front-rear direction, the vehicle-mounted battery pack comprises:

a lower cross member that extends in the vehicle width direction below the plurality of batteries placed in the battery disposition region and at a center of the battery tray in a front-rear direction of a vehicle body, and that is attached to the battery tray; and an upper cross member that extends in the vehicle width direction above the lower cross member and above the plurality of batteries, and by the upper cross member and the lower cross member, among the plurality of batteries arranged in the vehicle front-rear direction, ends of the plurality of batteries at a center side in the front-rear direction of the vehicle body are fixed to the battery tray.

* * * * *